(12) United States Patent
Wilde et al.

(10) Patent No.: US 6,414,911 B1
(45) Date of Patent: *Jul. 2, 2002

(54) FLYING OPTICAL HEAD WITH DYNAMIC MIRROR

(75) Inventors: Jeffrey P. Wilde, Mountain View; Joseph E. Davis, Morgan Hill; Jerry E. Hurst, Jr., San Jose; John F. Heanue, Fremont; Kurt Petersen, San Jose; Terry McDaniel, Morgan Hill; Jeff Drazan, Atherton, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/226,423

(22) Filed: Jan. 6, 1999

Related U.S. Application Data (63) Continuation of application No. 08/731,214, filed on Oct. 10, 1996, now Pat. No. 6,044,056.
(60) Provisional application No. 60/022,775, filed on Jul. 30, 1996, provisional application No. 60/023,476, filed on Aug. 6, 1996, and provisional application No. 60/025,801, filed on Aug. 27, 1996.

(51) Int. Cl.[7] .................................................. G11B 7/00
(52) U.S. Cl. ................ 369/13; 369/112.29; 369/112.01
(58) Field of Search ................................. 369/112, 119, 369/118, 44.23, 44.24, 13, 44.21, 124

(56) References Cited

U.S. PATENT DOCUMENTS

| | | | |
|---|---|---|---|
| 3,737,236 A | 6/1973 | Borrelli | 356/118 |
| 4,003,059 A | 1/1977 | Sugiura et al. | 346/108 |
| 4,175,832 A | 11/1979 | Umeki | 350/285 |

(List continued on next page.)

FOREIGN PATENT DOCUMENTS

| | | | |
|---|---|---|---|
| EP | 0331331 A2 | 9/1989 | G02B/6/42 |
| EP | 0419853 A2 | 4/1991 | G02B/26/08 |
| EP | 0460889 A2 | 11/1991 | G11B/7/085 |
| EP | 0460890 A2 | 11/1991 | G11B/7/085 |
| EP | 0469293 A1 | 2/1992 | G02B/26/08 |
| EP | 0539889 A2 | 5/1993 | H02N/1/00 |
| EP | 0588344 A2 | 3/1994 | G11B/7/00 |
| EP | 0614101 A2 | 9/1994 | G02B/26/08 |
| EP | 0650133 A2 | 4/1995 | G06K/7/10 |
| EP | 0664470 A2 | 7/1995 | G02B/26/08 |
| EP | 0712121 A2 | 5/1996 | G11B/7/09 |
| EP | 0715302 A1 | 6/1996 | G11B/7/135 |

(List continued on next page.)

OTHER PUBLICATIONS

Linder, et al. "Photolithography in Anisotropically Etched Grooves" IEEE 9th Annual Int. Workshop on Micro Electro Mechanical Systems Feb., 11–15, 1996 pp 38–43.

Barnes, et al. "Use of Optical Fiber Heads for Optical disks" Applied Optics vol. 25 No. 22 11/86 pp 4010–4012.

Suhara, "Integrated–Optic Disk Pickup Devices: Hybrid to Monolithic Integration" Int. Symposium on Optical Memory & Optical Data Storage 7/96 pp 284–286.

(List continued on next page.)

*Primary Examiner*—Thang V. Tran
*Assistant Examiner*—Kim-Kwok Chu
(74) *Attorney, Agent, or Firm*—Simon & Koerner LLP; Nancy R. Simon; Gregory J. Koerner (57) ABSTRACT

A magneto-optical flying head utilizes a steerable mirror in combination with a light source and a lens to write and read data onto a magneto-optical storage disk. A beam of laser light transmitted from the light source to the optical head is reflected onto a steerable micro-machined folding mirror. The reflected light from the folding mirror is directed through an embedded micro-objective GRIN lens. Fine tracking and short seeks to adjacent tracks are performed by rotating the mirror about an axis of rotation. In this way a focus spot is scanned back and forth in a direction which is approximately parallel to the radial direction of the storage disk.

2 Claims, 10 Drawing Sheets

U.S. PATENT DOCUMENTS

| | | | |
|---|---|---|---|
| 4,581,529 A | 4/1986 | Gordon | 250/227 |
| 4,740,951 A | 4/1988 | Lizet | 370/3 |
| 4,799,210 A | 1/1989 | Wilson | 369/110 |
| 4,945,400 A | 7/1990 | Blonder et al. | 357/74 |
| 5,033,043 A | 7/1991 | Hayakawa | 369/121 |
| 5,105,408 A | 4/1992 | Lee | 369/44.16 |
| 5,119,361 A | 6/1992 | Tanabe | 369/121 |
| 5,152,597 A | 10/1992 | Barnard | 359/130 |
| 5,153,870 A | 10/1992 | Lee | 369/111 |
| 5,197,050 A | 3/1993 | Murakami | 369/13 |
| 5,199,090 A | 3/1993 | Bell | 365/33 |
| 5,212,582 A | 5/1993 | Nelson | 359/224 |
| 5,218,582 A | 6/1993 | Marchant | 369/14 |
| 5,233,456 A | 8/1993 | Nelson | 359/214 |
| 5,233,587 A | 8/1993 | Asano | 369/44.42 |
| 5,243,241 A | 9/1993 | Wang | 310/36 |
| 5,245,491 A | 9/1993 | Horie | 360/114 |
| 5,253,245 A | 10/1993 | Rabedeau | 369/119 |
| 5,255,260 A | 10/1993 | Yamada | 369/199 |
| 5,295,122 A | 3/1994 | Murakami | 369/13 |
| 5,296,988 A | 3/1994 | Fujino | 360/110 |
| 5,313,442 A | 5/1994 | Ohtsuka | 369/44.16 |
| 5,325,116 A | 6/1994 | Sampsell | 346/108 |
| 5,327,416 A | 7/1994 | Lee | 369/199 |
| 5,331,454 A | 7/1994 | Hornbeck | 359/224 |
| 5,351,229 A | 9/1994 | Brezoczky | 369/99 |
| 5,432,763 A | 7/1995 | Campbell | 369/44.19 |
| 5,444,566 A | 8/1995 | Gale | 359/291 |
| 5,481,386 A | 1/1996 | Shimano | 369/44.12 |
| 5,504,731 A | 4/1996 | Lee | 369/112 |
| 5,519,677 A | 5/1996 | Shibata | 369/44.16 |
| 5,536,926 A | 7/1996 | Ikeda et al. | 235/462 |
| 5,563,871 A | 10/1996 | Bargerhuff et al. | 369/119 |
| 5,625,483 A | 4/1997 | Swartz | 359/224 |
| 5,737,302 A | 4/1998 | Kasahara | 369/118 |
| 5,742,419 A | 4/1998 | Dickensheets et al. | 359/201 |

FOREIGN PATENT DOCUMENTS

| | | | |
|---|---|---|---|
| GB | 2016744 A | 9/1979 | G05D/27/02 |
| GB | 2016744 | 9/1979 | |
| JP | 59117180 | 6/1984 | |
| WO | WO9507184 | 3/1995 | B41J/2/48 |
| WO | WO9513638 | 5/1995 | H01S/3/085 |
| WO | WO9607950 | 3/1996 | G02F/1/035 |

OTHER PUBLICATIONS

"Integration of Deformable Mirror Devices With Optical Fiber And Waveguides"; Authors: R. M. Boysel, T. G. McDonald, G. A. Magel, G. C. Smith, and J. L. Leonard; SPIE vol. 1793 Integrated Optics and Microconstructures (1992); pp. 34–39.

Laser–To–Fiber Coupling Module Using A Micromachined Alignment Mirror; Authors: M. J. Daneman, O. Solgaard, N.C. Tien, K. Y. Lau, and R. S. Muller; IEEE Photonics Technology Letters, vol. 8, No. 3: Mar. 1996; pp. 396–398.

Jerman, "Recent Trends in Silicon Micromachining Technology" SPIE vol.2639 1995 pp 3–8.

Dickensheets, et al. "Micromachined Scanning Confocal Optical Microscope" Optics Letters vol. 21 No. 10 5/96 pp 764–766.

Howe, "Polysilicon Integrated Microsystems: Technologies and Applications" 8th Int. Conference on Solid State Sensors and Actuators 6/95 pp 43–46.

Reynard, et al. "Magneto Optical Reading and Writing Integrated Heads: A Way to a Multigigabyte Multi–Rigid–Disk Drive" SPIE vol. 1499 1991 pp 238–246.

Opsasnick, et al. "Optical Fibers for Magneto–Optical Recording" SPIE vol. 1499 1991 pp 238–246.

Coughlin, et al. "Design Trends in Head/Gimbal Assemblies for Hard–Disk Drives" Data Storage 5/95 pp 23–31.

3M Corp. "Introduction to Polarization–Maintaining Fibers" 3M Specialty Fibers Sales Publication 78–6900–3455–4 rev. A 1995.

Garvey, et al. "Single–Mode Nonlinear–Optical Polymer Fibers" J. Optical Society Am. B. vol. 13 No. 9 9/96 pp 2017–2023.

Petersen, "Silicon as a Mechanical Material" Proceedings of the IEEE vol 70 No.5 5/82 pp 420–457.

Petersen, "Silicon Torsional Scanning Mirror" IBM J. Res. Development vol. 24 No. 5 9/80 pp 631–637.

FLYING OPTICAL HEAD WITH DYNAMIC MIRROR

CROSS REFERENCE TO RELATED APPLICATIONS

This application claims benefit of: Provisional Application Serial No. 60/022,775, entitled "A Data Storage And Retrieval System Based on Flying Magneto-Optical Head," filed on Jul. 30, 1996; Provisional Application Serial No. 60/023,476, entitled "A Data Storage And Retrieval System Based on A Flying Magneto-Optical Head," filed on Aug. 6, 1996; Provisional Application Serial No. 60/025,801, entitled "A Data Storage And Retrieval System Based on A Flying Magneto-Optical Head," filed on Aug. 27, 1996, and A con of copending U.S. application Ser. No. 08/731,214. Entitled "Flying Optical Head With Dynamic Mirror," filed on Oct. 10, 1996 now U.S. Pat. No. 6,044,056, issued on Mar. 28, 2000. The subject matter of each of these related applications is incorporated herein by reference. All related applications are commonly assigned.

BACKGROUND OF THE INVENTION

1. Field of the Invention

The present invention relates generally to optical data storage systems and more particularly to flying optical heads for use in optical data storage systems.

2. Background Art

In a magneto-optical storage system, using a Magneto-Optical (MO) recording material deposited on a rotating disk, information may be recorded on the disk as spatial variations of magnetic domains. During readout, the magnetic domain pattern modulates an optical polarization, and a detection system converts a resulting signal from optical to electronic format.

In one type of magneto-optical storage system, a magneto-optical head assembly is located on a linear actuator that moves the head along a radial direction of the disk to position the optical head assembly over data tracks during recording and readout. A magnetic coil is placed on a separate assembly on the head assembly to create a magnetic field that has a magnetic component in a direction perpendicular to the disk surface. A vertical magnetization of polarity, opposite to the surrounding material of the medium, is recorded as a mark indicating zero or a one by first focusing a beam of laser light to form an optical spot on the disk. The optical spot functions to heat the magneto-optical material to a temperature near or above a Curie point (i.e., a temperature at which the magnetization may be readily altered with an applied magnetic field). A current passed through the magnetic coil orients the spontaneous magnetization either up or down. This orientation process occurs only in the region of the optical spot where the temperature is suitably high. The orientation of the magnetization mark is preserved after the laser beam is removed. The mark is erased or overwritten if it is locally reheated to the Curie point by the laser beam while the magnetic coil creates a magnetic field in the opposite direction.

Information is read back from a particular mark on the disk by taking advantage of the magnetic Kerr effect to detect a Kerr rotation of the optical polarization that is imposed on a reflected beam by the magnetization at the mark of interest, the magnitude of the Kerr rotation being determined by the material's properties (embodied in the Kerr coefficient). The sense of the rotation is measured by established differential detection schemes as being clockwise or counter-clockwise depending on the direction of the spontaneous magnetization at the mark of interest.

Conventional magneto-optical heads, while presently providing access to magneto-optical disks with areal densities on the order of 1 Gigabit/in$^2$, tend to be based on relatively large optical assemblies which make the physical size of the head rather bulky (3–15 mm in a linear dimension). Consequently the speed at which conventional magneto-optical heads are mechanically moved to access new data tracks on a magneto-optical storage disk is slow. In addition, due to the large size of these optical assemblies, most commercially available magneto-optical disk drives use only one magneto-optical head to enable reads and writes to one side of a magneto-optical disk at a time. For example, a commercial magneto-optical storage device presently available provides access to one side of a 130 mm double sided 2.6 ISO gigabyte magneto-optical disk, a 40 ms disk access time, and a data transfer rate of 4.6 MB/Sec.

N. Yamada (U.S. Pat. No. 5,255,260) discloses a low-profile flying optical head for accessing an upper and lower surface of a plurality of optical disks. The flying optical head disclosed by Yamada uses a static mirror or prism for delivering light to and receiving light from a phase-change optical disk. While the static optics described by Yamada provides access to both surfaces of a plurality of phase-change optical disks contained within a fixed volume, use of the optics disclosed by Yamada is inherently limited by how small the optics can be made. Consequently, the number of optical disks that can be manufactured to function within a given volume is also limited. Another shortcoming relates to the use of static folding mirrors. This approach imposes a limit on track servo bandwidth by requiring the entire optical head assembly to move in order to change the location of a focused optical spot. This same limitation applies to the flying magneto-optical head disclosed by Murakami et al. in U.S. Pat. No. 5,197,050. In general, the larger the mass of the element used to perform fine track servoing, the lower the servo bandwidth becomes and the lower the track density that can be read or written.

A method for moving a folding prism or mirror with a miniature galvanometer actuator for fine tracking has been disclosed by C. Wang in U.S. Pat. No. 5,243,241. The galvanometer consists of bulky wire coils and a rotatable magnet mounted on a linear actuator arm attached to a flying magneto-optical head, but not mounted on the slider body itself. This design limits the tracking servo bandwidth and achievable track density due to its size and weight. Its complexity also increases the cost and difficulty of manufacture.

What is needed is an improved magneto-optical flying head that is compact, thus allowing an increase in the number of magneto-optical disks that can be placed within a given volume as compared to the prior art. The improved flying optical head should preferably provide a high numerical aperture, a reduced head mass, a very high resonance frequency fine track servoing device thus producing a very fine track servo bandwidth, and be relatively easy to manufacture. Additionally, the flying magneto-optical head should improve upon magneto-optical disk drive access times, data transfer rates, and usable magneto-optical disk track densities.

SUMMARY OR THE INVENTION

The present invention functions to improve data storage and retrieval in a system based on a Flying Magneto-Optical (FMO) head that preferably provides a high numerical aperture, reduced head mass, high fine track servo bandwidth, increased magneto-optical disk track density, reduced data access time, increased data transfer rates, an increase in the number of magneto-optical disks accessible in a given volume, and the ability to read and write to both sides of each disk to be used.

In the preferred embodiment, the mechanical architecture of a magneto-optical storage device incorporates a low profile head into a magneto-optical data system which uses a Winchester type rotary actuator arm, suspension, and air bearing technology. In the preferred embodiment the laser optics assembly couples an optical light source to one or more head arms which each support an optical head for writing and reading data for disk storage media. In the preferred embodiment during writing, lighting is delivered through an individual Single Mode Polarization Maintaining (SMPM) optical fiber to a respective magneto-optical head for the purpose of locally heating the surface of a rotating magneto-optical (MO) storage media, thereby producing a "hot spot." A magnetic coil embedded in the optical head is used to produce a magnetic field that in turn spontaneously magnetizes the region within the hot spot with a vertical orientation either up or down. Thus, as the MO storage medium rotates, the applied magnetic field is modulated so as to encode digital data as a pattern of "up or down" magnetic domain orientations. During read out, light at a lower intensity is delivered from the individual SMPM optical fibers to an FMO head for the purpose of probing the rotating storage media with a focused optical spot. The readout is programmed in such a way that the magnetization direction of the medium at the location of the focused optical spot alters an optical polarization of the light via the magneto-optic KERR effect. In this way, the pattern of up or down magnetization orientations representative of the stored digital data modulates the polarization of the light reflected from the MO storage media. The reflected light signal from the storage media then couples back through the FMO head to a differential amplifier for decoding.

The beam of laser light transmitted from the optical fiber to the optical head is reflected onto a steerable micro-machined folding mirror. The reflected light from the folding mirror is directed through an embedded micro-objective lens such as a GRIN lens. In the preferred embodiment, fine tracking and short seeks to adjacent tracks are performed by rotating the micro-machined mirror about an axis of rotation. In this way a focused optical spot is scanned back and forth in a direction which is approximately parallel to the radial direction of a storage disk. Use of a micro-machined steerable mirror makes possible a light weight, cost-efficient, FMO head with MO storage media having extremely high data densities.

DETAILED DESCRIPTION OF THE PREFERRED EMBODIMENTS

Figure 1:
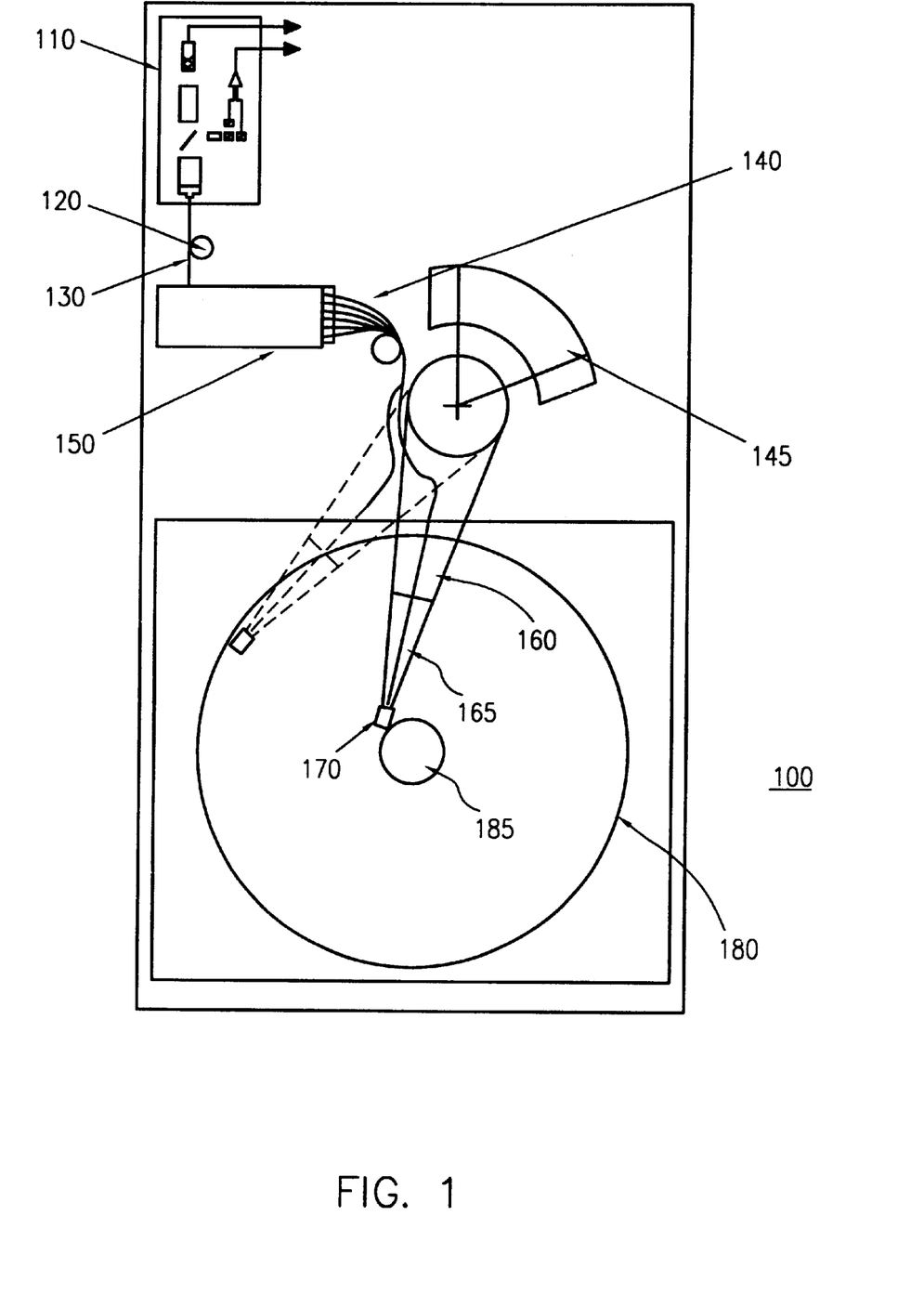
FIG. 1 is a pictorial view of a preferred magneto-optical storage device.

Referring now to FIG. 1, an embodiment of a magneto-optical storage device is shown. In the present invention, the mechanical architecture of magneto-optical storage device 100 incorporates Flying Magneto-Optical (FMO) head technology with Winchester-type rotary actuator arm, suspension, and air bearing technology in a Magneto-Optical (MO) data storage system. In the preferred embodiment, magneto-optical storage device 100 includes laser-optics assembly 110, a Single-Mode Polarization Maintaining (SMPM) optical fiber 130, a phase compensator 120, a fiber optic switch 150, an actuator magnet and coil 145, a plurality of SMPM optical fibers 140, a plurality of head arms 160, a plurality of suspensions 165, a plurality of MO storage media 180, and a plurality of FMO heads 170. Each of the plurality of MO storage media 180 are preferably mounted on a spindle 185 for continuous rotation at a constant angular velocity and each of the plurality of FMO heads 170 are preferably attached via a respective flexible suspension 165 and head arms 160 to the electromagnetic actuator magnet and coil 145. Those skilled in the art will recognize that MO storage device 100 may comprise as few as one FMO head 170 and one MO storage medium 180 or an upper and lower FMO head 180 per a plurality of MO storage media 180.

Figure 2:
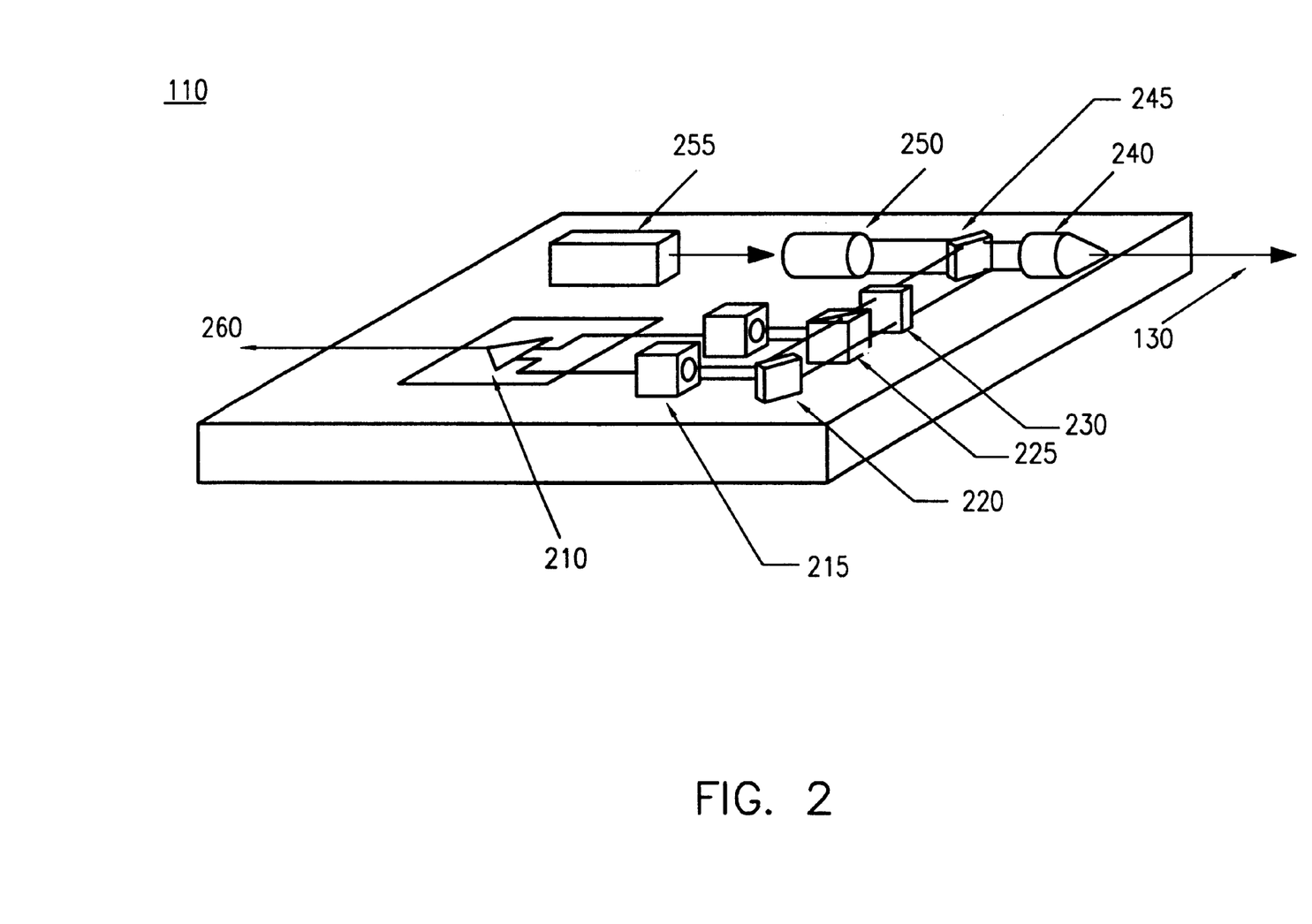
FIG. 2 is a schematic view showing the laser/optics assembly of the magneto-optical storage device of FIG. 1.

Referring now also to FIG. 2, laser/optics assembly 110 includes a laser optical source, a differential photodiode detector system and associated optical components, preferably as a separate subassembly 110 or alternatively as a hybrid integrated circuit component. In the preferred embodiment, laser-optics assembly 110 further includes a laser diode 255 polarized optical light source that is a 30–40 mw laser diode or diode-pumped micro-chip laser operating in the visible or near ultraviolet region (preferably in the vicinity of 635 nm), a leaky beam splitter 245, collimating optics 250 that are used before passing the laser light from the laser diode 255 to a leaky beam splitter 245, and a coupling lens 240 that is preferably a Gradient Refractive Index (GRIN) lens that focuses outgoing light from leaky beam splitter 245 into a Single-Mode Polarization-Maintaining (SMPM) optical fiber 130 feed.

In the preferred embodiment, phase compensator 120 is used to compensate for relative phase fluctuations that occur between inherent dual polarization modes of each of polarization-maintaining optical fibers 130 and 140. Each of the polarization modes of optical fibers 130 and 140 experience different refractive indices because of an inherent birefringence of the fibers. For example, relative phase fluctuations may arise because of a slight variation in a difference between the two refractive indices caused by changes in temperature, pressure, and mechanical motion of each of optical fibers 130 and 140. These fluctuations may be sensed by laser-optics assembly 110, and before significant changes occur, a feedback servo (not shown) adjusts the phase compensator to cancel the fluctuation. In this way, an optical path formed by optical fibers 130 and 140, to and from the flying magneto-optical head 155, may be treated similar to a free-space optical path in terms of its polarization properties.

In the preferred embodiment, phase compensator 120 includes a piezoelectric cylindrical shell, preferably made of a piezoelectric material such as lead zirconate titanate, to form a phase modulator and that has a height preferably less than its diameter to provide a low-profile shape suitable for use in a compact magneto-optical storage system with reduced electrical capacitance for faster operation. Optical fiber 130 may be attached to the circumference of phase compensator 203 with an ultraviolet-curing epoxy or similar adhesive. In the preferred embodiment, metal electrodes are deposited on flat ends of the cylinder to reduce capacitance so that a voltage applied across the electrodes acts to induce an expansion of the shell in a radial direction, thereby stretching optical fiber 130. The stretching action serves to provide phase modulation. To minimize mechanical stress on the optical fiber 130, the diameter of the phase compensator 120 is preferably greater than a few hundred times the fiber cladding diameter of the optical fiber 130. For example, a fiber cladding diameter of approximately 80 μm corresponds to a phase compensator 120 diameter in the vicinity of 10 to 40 mm.

In the preferred embodiment, fiber optic switch 150 accepts single-mode PM optical fiber 130 at an input port and routes the light emanating from this fiber to one of the single-mode PM optical fibers 140 at an output port. The switching properties of fiber optic switch 150 are bi-directional so that light propagating back to the switch 150 along any one of the SMPM optical fibers 140 at the output port may also be routed to the optical fiber 130 at the input port. The SMPM optical fibers 140 from the fiber optic switch 150 are preferably routed along respective head arms 160 and suspensions 165 to respective flying magneto-optical heads 170. In the preferred embodiment, there is one SMPM optical fiber 140 per FMO head 170, and the fiber optic switch 150 is used to select which magneto-optical head 170 is active for reading or writing a respective surface of MO storage media 180.

In the preferred embodiment, during writing, light is delivered through an individual optical fiber 140 to a respective FMO head 170 for the purpose of locally heating a respective surface of a rotating magneto-optical storage media 180, thereby producing a "hot spot." A magnetic coil embedded on FMO head 170 (subsequently discussed in more detail) is used to produce a magnetic field that in turn spontaneously magnetizes the region within the hot spot with a vertical orientation either up or down. Thus, as the MO storage medium 180 rotates, the applied magnetic field is modulated so as to encode digital data as a pattern of "up or down" magnetic domain orientations. During readout, polarized light at a lower intensity is delivered through an SMPM optical fiber 140 to a respective FMO head 170 for the purpose of probing rotating storage medium 180 with a focused optical spot. The readout is performed in such a way that the magnetization direction of MO storage medium 180 at the location of the focused spot alters an optical polarization of the light via the magneto-optic Kerr effect. In this way, the pattern of up or down magnetization orientations representative of the stored digital data modulates the polarization of the light reflected from the MO storage medium 180. The reflected light signal from the MO storage medium 180 then couples back through the FMO head 170, one of the plurality of SMPM optical fibers 140, and the fiber optic switch 150, finally reaching two photodiode detectors 215 for conversion into electronic formats by differential amplifier 210.

Figure 3:
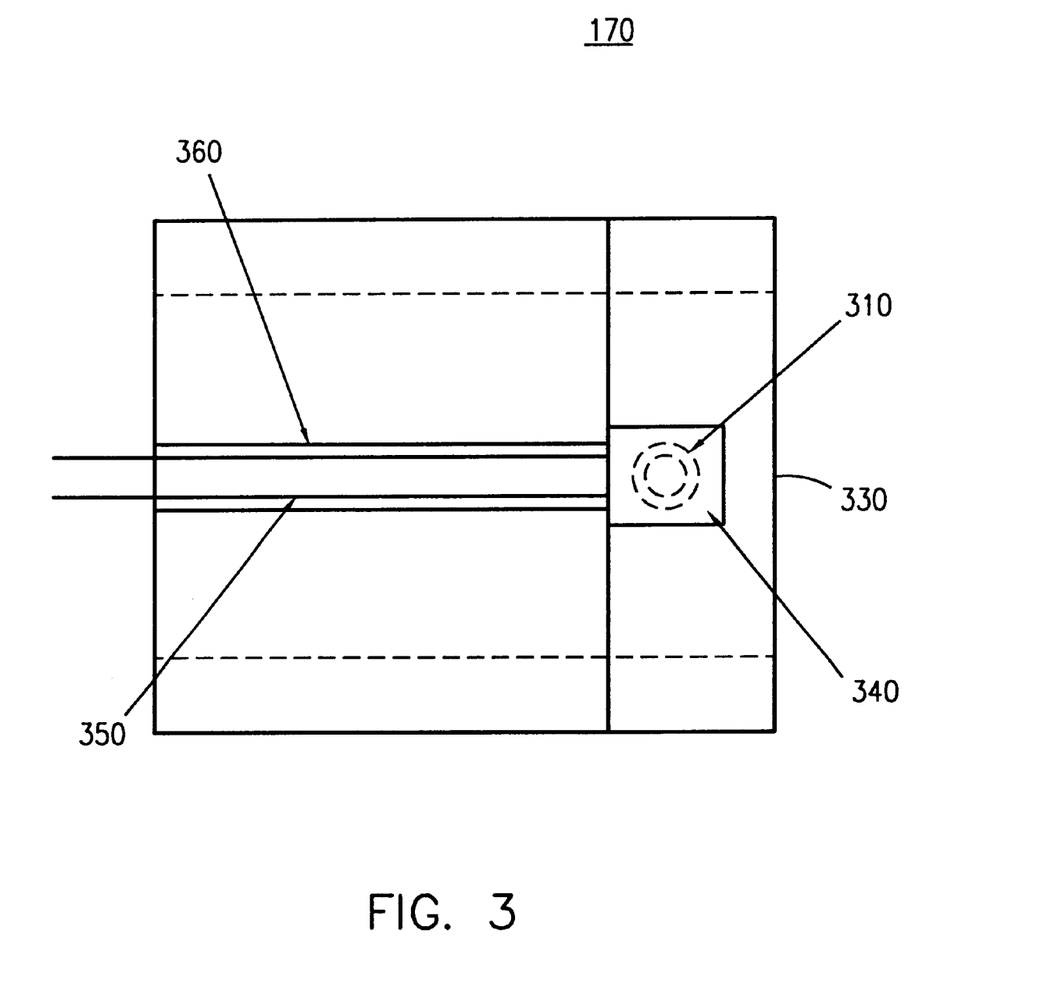
FIG. 3 shows a top view of the flying magneto-optical head of FIG. 1.

Referring now to FIG. 3 a diagram is shown illustrating top view details of a flying magneto-optical head 170. In the preferred embodiment, each flying magneto-optical head 170 includes a small slider body 330. The FMO head 170 further includes a v-groove 360 for holding a SMPM fiber 350, a steerable micro-machined folding mirror 340, and a magnetic coil 310.

Figure 4:
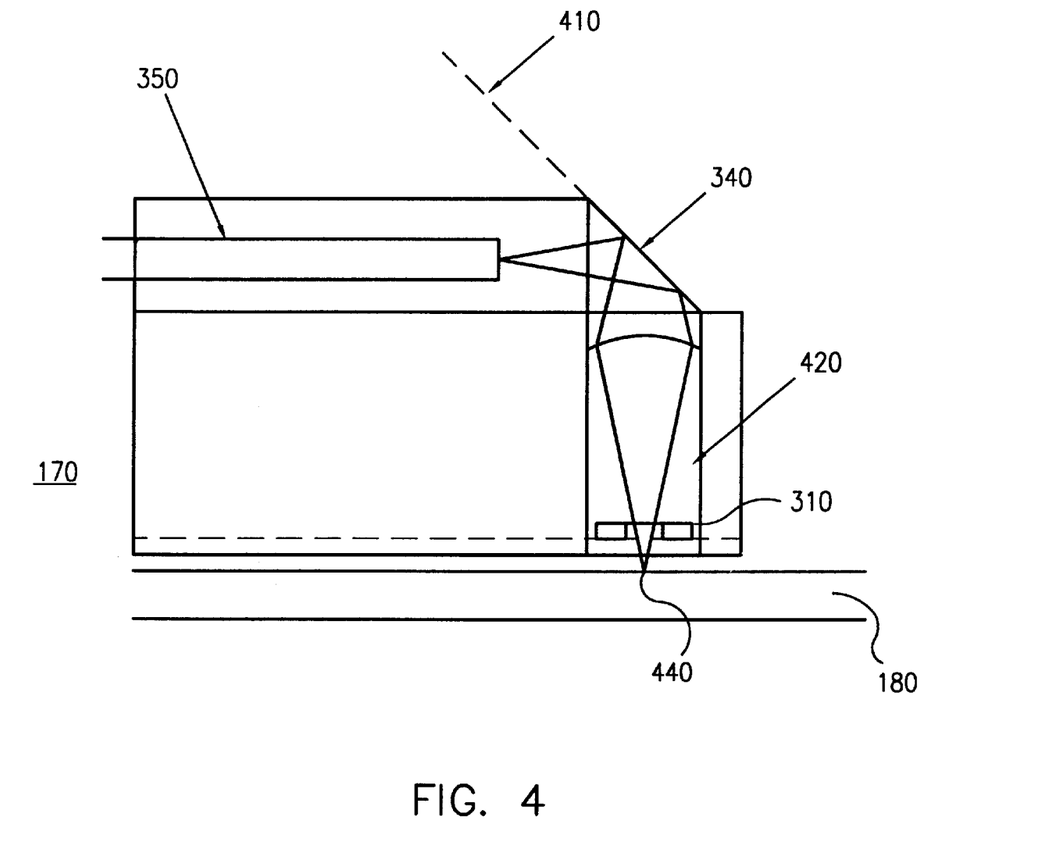
FIG. 4 is a side view of the flying magneto-optical head of FIG. 3.
Figure 5:
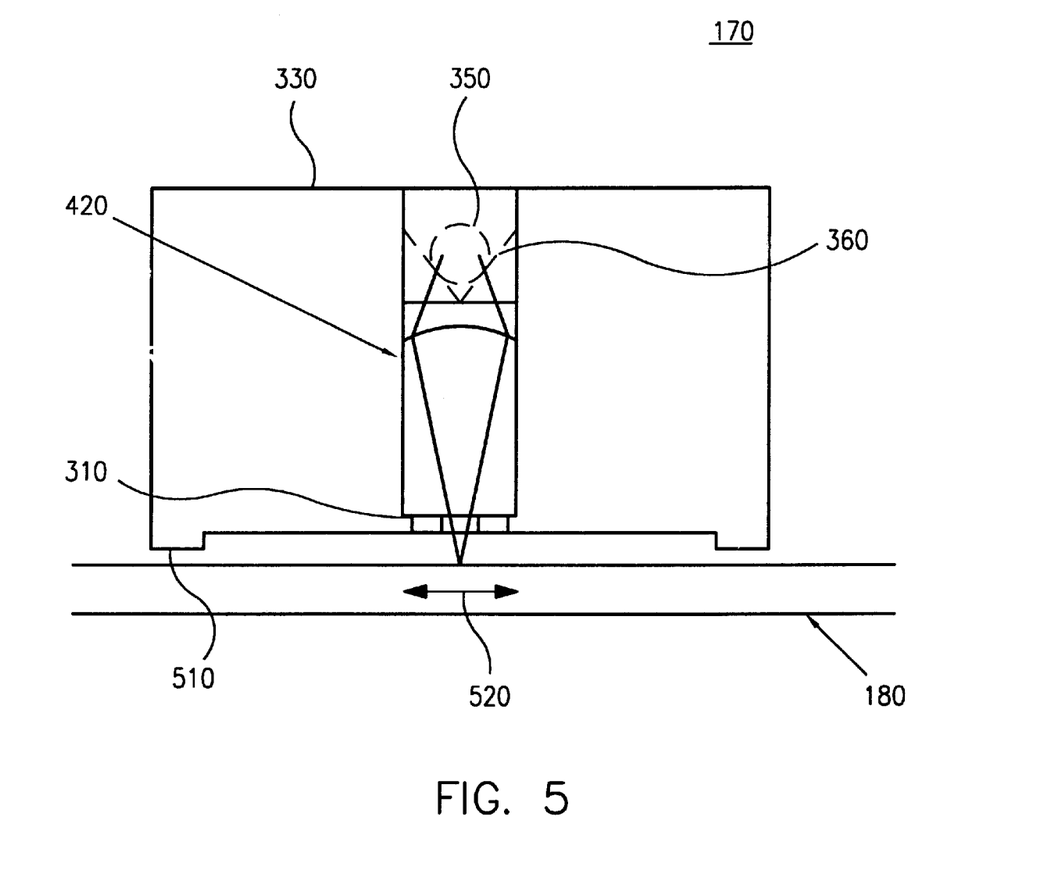
FIG. 5 is a front view of the flying magneto-optical head of FIG. 3.

Referring also now to FIG. 4, a side view of the flying magneto optical head 170 of FIG. 3 is shown. FIG. 5 shows a front view of the same FMO head 170. In the preferred embodiment, head 170 utilizes an air bearing surface 510 flying above or below a coated upper surface of an MO storage medium 180. A polarized beam of laser light is transmitted through the SMPM optical fiber 350 to the steerable micro-machined folding mirror 340. The axis of the v-groove, and hence the axis of the fiber 350 lying in the v-groove, is approximately parallel to the medium 180 surface. Light exiting the fiber 350 is reflected by the micro-machined folding mirror 340 at an average angle of approximately ninety degrees to the axis of optical fiber 350. The reflected light is directed through an embedded microobjective lens such as a GRIN lens 420. In the preferred embodiment, fine tracking and short seeks to adjacent tracks are performed by rotating the mirror 340 about a rotation axis 410 (shown in FIG. 4). In this way a focused optical spot 440 is scanned back and forth in a direction 520 which is approximately parallel to the radial direction of the medium 180. As the actuator arm 160 moves the slider body 330 back and forth across the surface of the medium 180, the position of the slider body may become skewed slightly such that the direction 520 is not precisely parallel to the radial direction of the MO storage medium 180. Although not precisely parallel, the skew angle is sufficiently small that a substantial component of scanning direction 520 lies along the radial direction of the storage medium 180.

Figure 6:
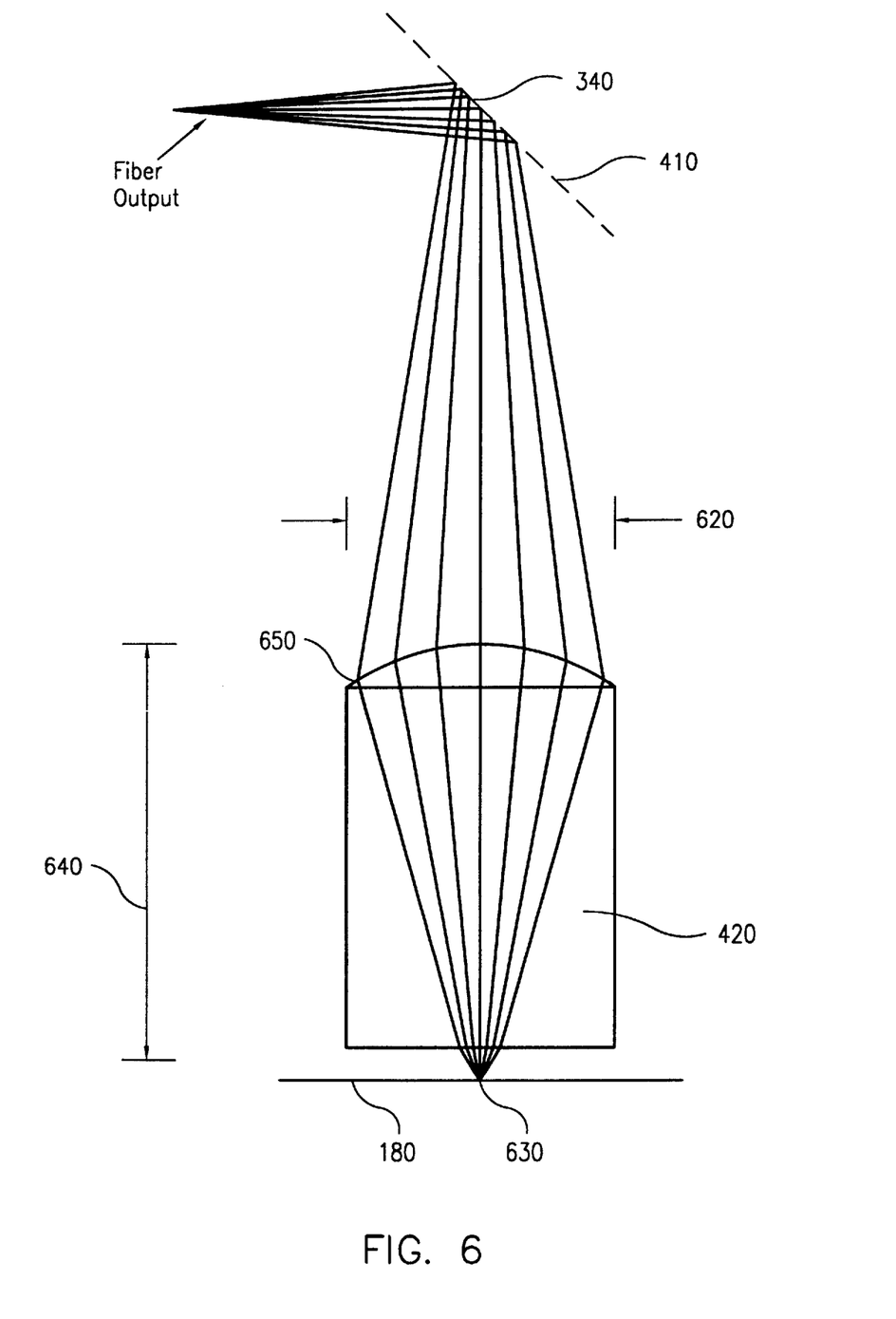
FIG. 6 is side view showing the light path through the magneto-optical head of FIG. 4.

Referring now also to FIG. 6, a side view is shown of the preferred lens 420 of the present invention. The light reflected from folding mirror 340 is collected by a focusing optic comprising an objective GRIN lens 420 that functions to focus the reflected light onto a surface of the MO storage medium 180. The position of optical fiber 350 within v-groove 360 may be adjusted, thereby changing the distance from the end of the SMPM optical fiber 350 to mirror 340. Relocating the position of the SMPM optical fiber 350 within v-groove 360 effectively adjusts the location of the focal point of light 630 exiting lens 420. Once fiber 350 is positioned for proper focus on the surface of medium 180, the fiber may be secured in place by means of ultraviolet (UV) curing epoxy or similar adhesive.

Use of a GRIN lens 420 provides a simple compact cylindrical shape, allowing the lens to be inserted into a hole in the slider body 330 easily. To minimize spherical aberration and achieve diffraction-limited focusing, the lens 420 is polished to assume a plano-convex shape with the convex surface 650 being a simple spherical shape. The thickness 640 and radius of curvature of the lens 420 depends on a number of factors including the magnitude of the refractive index gradient, the wavelength of light, the numerical aperture of the SMPM fiber 350, and the desired focused optical spot 440 size as determined by the effective numerical aperture of the lens 420. In the preferred embodiment, the lens 420 thickness 640 is approximately 170–500 μm, the radius of curvature is approximately 150–400 μm, and the lens diameter 620 is approximately 200–500 μm.

While the preferred embodiment illustrated in FIGS. 3–6 discloses a single element objective lens comprising a GRIN lens, it will be appreciated by those skilled in the art that additional objective optics may also be used to enhance the properties of the lens 420. For example, the focusing objective optics may include either an aplanatic lens or a solid immersion lens in conjunction with the GRIN lens 420. Use of such an additional lens element achieves a larger numerical aperture and hence a smaller focused optical spot 440 size. A smaller spot 440 size permits higher areal data densities to be written to and read from the MO storage medium 180.

Micro-optic lenses made by molding glass or plastic may also be used in place of the GRIN lens 420. For example, two molded plano-convex aspherical lens may be combined by placing the two convex surfaces toward one another to provide a miniature lens system with high numerical aperture and good off-axis performance as the mirror 340 is rotated. In a dual aspherical optical design, light would be approximately collimated between the two optical elements thus, a quarter wave plate could be placed between the two elements without requiring additional lenses. In another embodiment, a single molded spherical lens with low numerical aperture (0.2–0.4) may be used in conjunction with an aplanatic or solid immersion lens to yield an optical focusing system with relatively high numerical aperture (greater than 0.6). From a manufacturing perspective, molded lenses are attractive because they can be produced in high volume at low cost. One method disclosed here for mass production involves molding a lens array and subsequently sectioning of the array by diamond saw cutting or laser cutting to obtain individual lenses. Regarding the aforementioned two-lens design, two molded plano-convex lens arrays may be mated by means of tapered fittings before sectioning to ensure accurate lens alignment.

Figure 7:
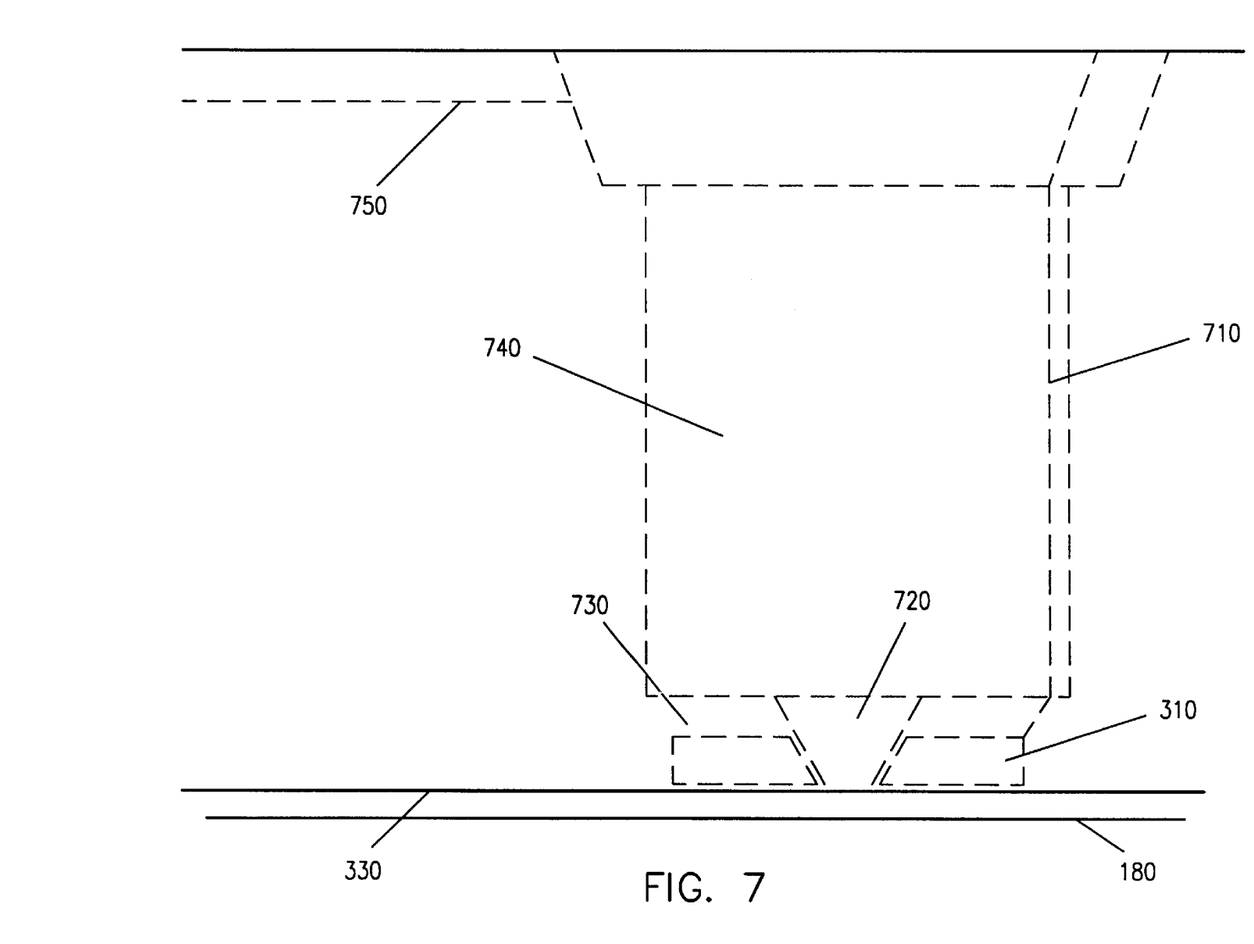
FIG. 7 is a side view schematic diagram showing details of the magneto-optical head of FIG. 4.

Referring now also to FIG. 7, a side view schematic diagram is shown of the head 170 details of FIG. 4. In the preferred embodiment, magnetic coil 310 is embedded below the GRIN lens 420 as part of FMO head 170. Magnetic coil 310 creates a magnetic field with a large component in a direction normal (i.e., perpendicular) to the MO storage medium 180. An etch hole 740 or groove, into which the lens 420 is inserted, is etched from the top and stopped at a predetermined depth. Before etch hole 740 is fabricated, a small diameter light passage 720 opening is formed on the bottom of the slider body 330. During fabrication, the depth and diameter of light passage 720 is made to provide a clear optical path for a focused light beam. Light passage 720 is preferably conical in shape with a cone angle approximately equal to that of the focused cone of polarized light (approximately 37 degrees in half-angle for a numerical aperture of 0.6). In this way, a shelf 730 region is formed for supporting the lens 420 while also allowing a planar magnetic coil 310 to be deposited within a recessed area which is etched on the bottom side of the shelf. In the preferred embodiment, the diameter of light passage 720 is sufficiently large to accommodate off-axis steering of the polarized light.

In the preferred embodiment, the planar coil 310 delivers a magnetic field perpendicular to a MO storage medium 180 with a magnitude of approximately 170 Oe of either polarity at the magnetic storage layer of the MO storage medium 180, and comprises 2–3 layers with 5–10 plated conductor turns per layer. The number of layers and turns per layer is a function of the spacing between the coil 310 and the magnetic recording layer (typically in the range from 5–20 $\mu$m). In the preferred embodiment, the layer separation is approximately 6 $\mu$m, the plated conductor coil 310 loops have a radial pitch of about 5 $\mu$m, and the coil current required to generate a magnetic field of approximately 170 Oe is approximately 50–70 mA (zero-to-peak). The coil switching time is on the order of 10 nsec or less as dictated by the coil inductance (approximately 200 nH or less) and the driving electronics, and the coil 310 diameter ranges from about 10 $\mu$m in the innermost region to about 80 $\mu$m at the periphery, depending on the aforementioned gap between the coil and magnetic recording layer. Electrical coil leads 710 are preferably routed along the wall of hole 740 or through a separate hole in the slider body (not shown).

Figure 8:
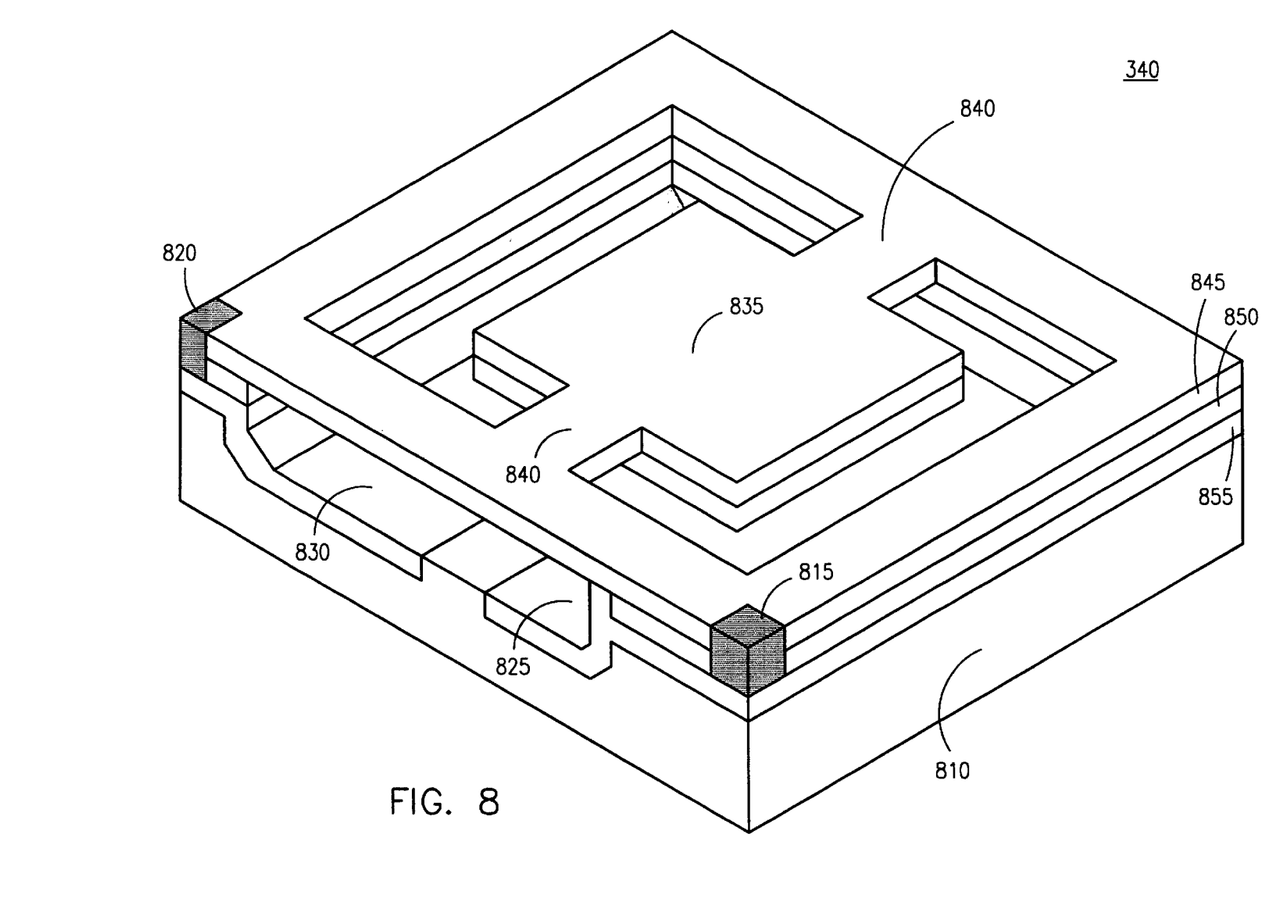
FIG. 8 is a perspective view showing a preferred micro-machined mirror of the assembly of FIG. 1.

Referring now to FIG. 8, a perspective view of a preferred embodiment of the micro-machined mirror 340 is shown. In a preferred embodiment, mirror 340 is a torsional mirror comprising a silicon substrate 810, drive electrodes 825 and 830, bonding pads 815 and 820, a bonded silicon plate 850, and a thin film flexure layer 845 made from a material such as silicon dioxide, silicon nitride, or silicon. The mirror 340 may be fabricated using micromachining techniques to yield a reflective inner torsional reflective area 835, comprising flexure layer 845 on top and silicon plate layer 855 on bottom for mechanical rigidity, and supported by flexure layer hinges 840. Reflective area 835 may be metalized with gold or a similar substance to increase the optical reflectivity and to improve the electrostatic actuation of the mirror. In the preferred embodiment, mirror 340 has a resonant frequency approximately in the range from 50 to 200 kHz, as determined by the particular geometry and material properties of the mirror. In the preferred embodiment, mirror 340 is approximately square with an approximate outer linear dimension in the range from 100–170 $\mu$m and a thickness of approximately 2–50 $\mu$m. In the preferred embodiment, inner reflective area 835 has an approximate outer linear dimension in the range from 25–200 $\mu$m and a thickness of approximately 1–20 $\mu$m. Preferably, mirror 340 may be driven torsionally without any excessive transverse motion.

In an exemplary embodiment, the reflective area 835 is preferably on the order of 100 $\mu$m on a side, the resonant frequency is preferably greater than 100 kHz, and the maximum physical angular deflection is preferably 2 degrees. In addition, the mirror 340 should preferably not warp either statistically or dynamically upon actuation and the maximum stress upon electrostatic deflection should preferably be well below the expected yield stress of the material used to construct the mirror (for example: silicon, silicon dioxide, silicon nitride, and aluminum).

The mirror 340 is operated by applying a differential voltage to the drive electrodes 825 and 830. The differential voltage on electrodes 825 and 830 results in an electrostatic force on reflective area 835. The reflective area 835 rotates about the hinges 840 enabling reflected light to be directed and scanned back and forth about the surface of medium 180. Operation of the mirror 340 is discussed further with reference to FIG. 10 below.

Figure 9:
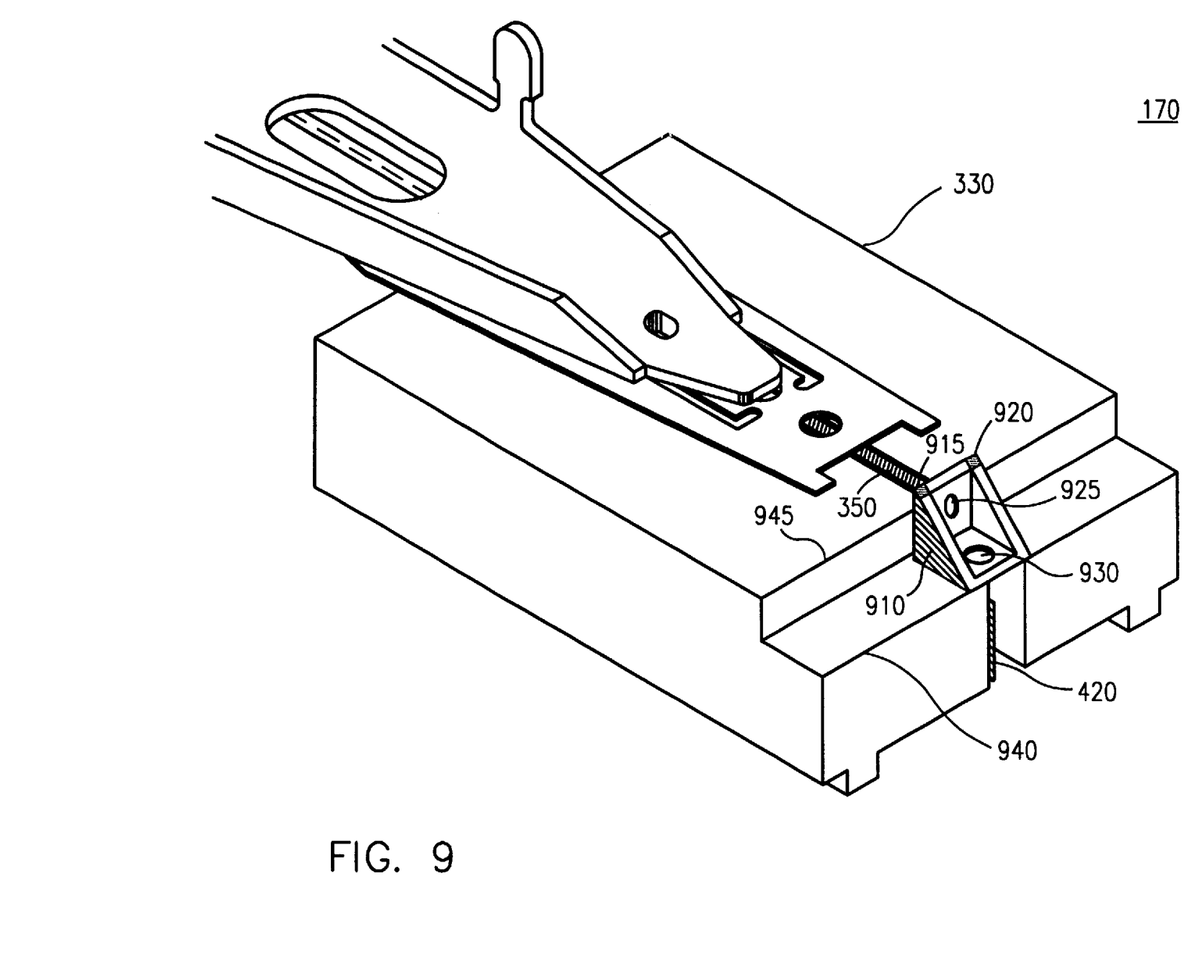
FIG. 9 is a perspective view showing the magneto-optical head of the preferred embodiment.

Referring now to FIG. 9, a perspective view is shown of the flying magneto-optical head 170 comprising a slider body 330 and mirror support 910. In the preferred embodiment, a mirror support 910 includes electrode pads 915 and 920 that provide an electrical contact point for application of a differential voltage to the corresponding bonding pads 815 and 820 located on mirror 340. Mirror support 910 additionally includes access holes 925 and 930 that function to provide a clear optical path from SMPM optical fiber 350, to mirror reflective area 835, and subsequently to lens 420, as previously discussed above. In the preferred embodiment, mirror support 910 provides mirror 340 a 45 degree support surface. Those skilled in the art will understand that mirror support 910 may be attached to slider body 330 and manufactured using any number of techniques such as micromachining the slider body 330 and mirror support 910 separately, then adhesively bonding the two pieces together. In another embodiment, a 45 degree angle may be created using other techniques such as leaning the mirror assembly against a suitably dimensioned slider having suitably dimensioned steps 940 and 945.

Figure 10:
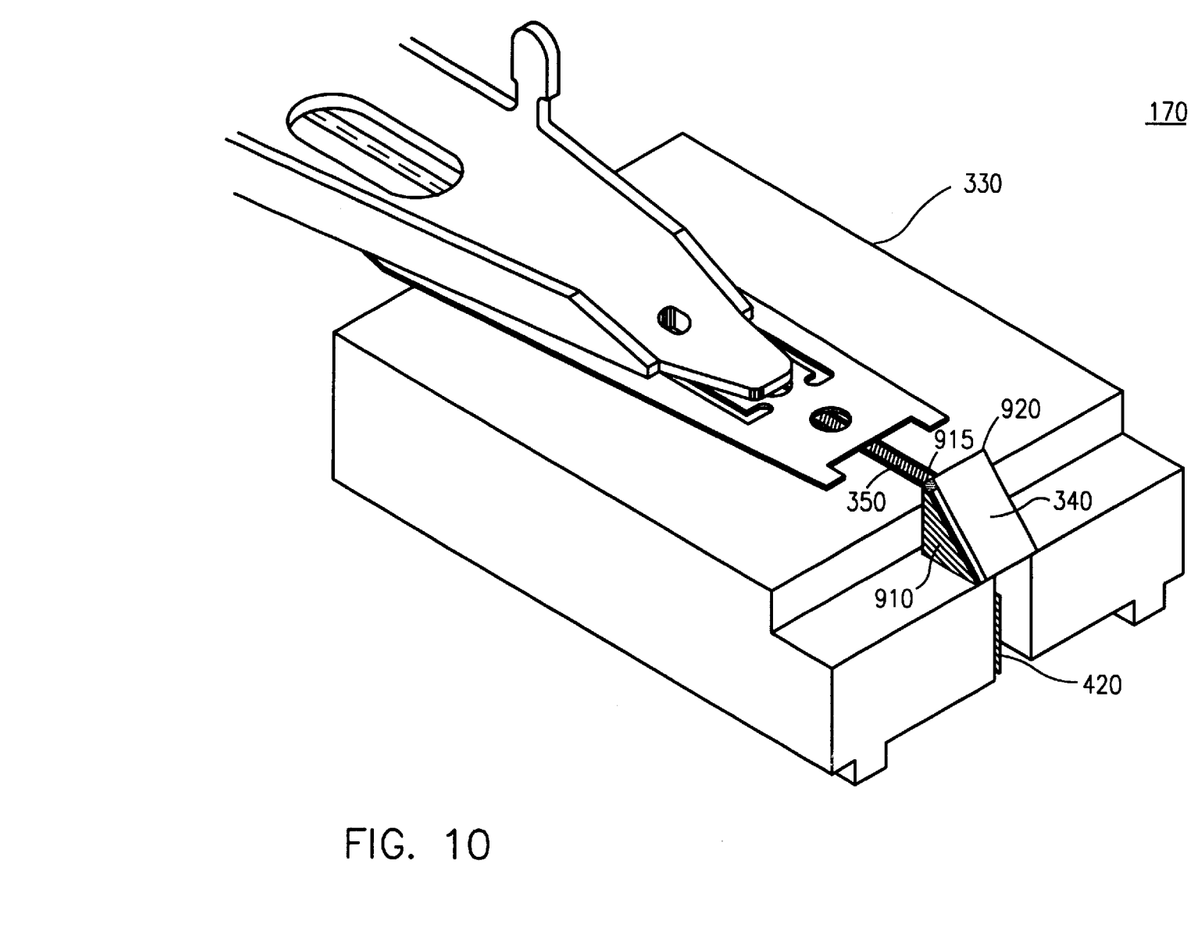
FIG. 10 is a perspective view showing the magneto-optical head of the preferred embodiment.

Referring now to FIG. 10 a steerable mirror 340 is shown mounted to a mirror support 910. An application of a differential voltage to electrode pads 915 and 920 functions to steer a beam of laser light supplied by SMPM optical fiber 350. The steerable micro-machined mirror 400 is used to change the propagation angle of the beam of polarized laser light before transmission to an objective lens 420. Movement of a resultant focal point of light 630 along a radial direction 520 of the storage medium 180 is used for track following and as well as for short seeks from one data track to another. In the preferred embodiment, track following may be accomplished by using combined coarse and fine tracking servo techniques. A sampled sector servo format may be used to define tracks. These servo marks may include either embossed pits stamped into the medium or magnetic marks read similar to data marks. In the case of embossed pits, those skilled in the art will recognize that the differential amplifier 210 output of the laser optics assembly 110 should be supplemented with an adder circuit. Coarse tracking may be maintained by continuously adjusting a current to an actuator coil (part of actuator magnet and coil 145 shown in FIG. 1) for controlling the position of a head arm suspension 165 while fine tracking may be accomplished by continuously adjusting an angular deflection of the steerable mirror 340.

The use of a steerable micro-machined mirror is advantageous because it offers a method for very fast manipulation of an optical beam. This approach facilitates high-speed track following and short seeks for much improved data access times. Such improvements over conventional head technology make possible high areal densities by enabling the use of very narrow track pitches. The FMO head 170 design is intrinsically confocal in nature. During readout, the reflected light from the MO storage medium 180 is coupled back into the SMPM optical fiber 140 which acts as the aperture in a confocal system. One of the benefits arising from the use of confocal optics include very high depth resolution along the optical axis as well as improved transverse resolution. Another advantage of the confocal system is that light reflected from objective optics surfaces is not collected so that anti-reflection coating may not be necessary. This is particularly advantageous in a design that uses an aplanatic lens and some non-zero working distance. The high depth resolution allows for very close spacing of the layers in a multi-layer media (not shown) with low crosstalk between layers, while the improved transverse resolution functions to provide detection of smaller storage media marks and sharper storage medium mark edges than would otherwise be the case in a non-confocal system.

The storage device 100 architecture and FMO head design illustrated in FIGS. 1–10 are representative of one approach to storing information on high-density MO storage media. It will be appreciated by those skilled in the art that various permutations of the present invention may also be implemented to achieve substantially the same goals. For example, various types of fiber optic switches (e.g., micromechanical, electro-optical, thermo-optical) may be utilized. In addition, the flying magneto-optical head design may be modified for use with a free space optical input beam, thereby eliminating optical fibers 140. Also, the focusing objective lens need not be limited to a GRIN lens because other micro-objective lenses (such as molded aspheres, holographic lenses, binary or other diffractive optical lenses) can also be utilized. The present invention may also be used as a read only or a write once flying optical head, or alternatively a flying optical head. Aspects of the present invention will be recognized by those skilled in the art as applicable to compact disk (CD) and digital video disks (DVD). Thus, those skilled in the art will also recognize that the present invention has aspects which are applicable to all optical storage systems.

Whereas many other alterations and modifications of the present invention will no doubt become apparent to a person of ordinary skill in the art after reading the foregoing description, it is understood that the particular embodiment shown and described by way of illustration is in no way to be considered limiting.

What is claimed is:

1. A magneto-optical storage device for storing and retrieving data, comprising:

at least one rotating magneto-optical storage medium;

an energy source for generating a polarized beam of radiation, the beam of radiation traversing an optical path between the energy source and a respective one of the at least one rotating magneto-optical storage medium;

at least one micro-machined reflector fabricated utilizing micro-machining techniques;

at least one compact flying head coupled with a respective one of the at least one micro-machined reflector, the respective micro-machined reflector including a dynamically steerable micro-machined reflective area for directing the optical path of the polarized beam of radiation to and from the respective rotating magneto-optical storage medium;

at least one support, a respective one of the at least one support coupled with a respective one of the at least one compact flying head for positioning the respective compact flying head over the respective rotating magneto-optical storage medium;

at least one single-mode polarization maintaining optical fiber, a respective one of the at least one single-mode polarization maintaining optical fiber disposed in the optical path for receiving the polarized beam of radiation, the respective single-mode polarization maintaining optical fiber coupled with the respective compact flying head for directing the beam of radiation between the energy source and the rotating magneto-optical storage medium;

at least one groove, the respective compact flying head including the at least one groove for aligning the optical path of the polarized beam of radiation received by the respective polarization maintaining optical fiber with respect to the dynamically steerable micro-machined reflective area; and at least one magnetic coil element, a respective one of the at least one magnetic coil element coupled with the respective compact flying head for providing a magnetic field to the respective rotating magneto-optical storage medium during writing of data.

2. A compact flying head for writing and reading of data by directing a polarized beam of radiation from an energy source to and from a rotating magneto-optical data storage medium, comprising:

a micro-machined reflector fabricated utilizing micro-machining techniques, the compact flying head coupled with the micro-machined reflector, the micro-machined reflector including a dynamically steerable micro-machined reflective area for directing an optical path traversed by the polarized beam of radiation to and from the respective rotating magneto-optical storage medium;

a single-mode polarization maintaining optical fiber, the single-mode polarization maintaining optical fiber disposed in the optical path for receiving the polarized beam of radiation, the single-mode polarization maintaining optical fiber coupled with the compact flying head for directing the beam of radiation between the energy source and the rotating magneto-optical storage medium;

a groove, the compact flying head including the groove for aligning the optical path of the polarized beam of radiation received by the polarization maintaining optical fiber with respect to the dynamically steerable micro-machined reflective area; and a magnetic coil element, the magnetic coil element coupled with the compact flying head for providing a magnetic field to the rotating magneto-optical storage medium during writing of data.

* * * * *

UNITED STATES PATENT AND TRADEMARK OFFICE
CERTIFICATE OF CORRECTION

PATENT NO. : 6,414,911 B1  Page 1 of 1
DATED : July 2, 2002
INVENTOR(S) : Jeffrey P. Wilde et al.

It is certified that error appears in the above-identified patent and that said Letters Patent is hereby corrected as shown below:

Column 1,
Line 15, "A con of" should be deleted.

Column 2,
Line 63, "OR" should read -- OF --.

Column 5,
Line 64, "formats" should read -- format --.

Signed and Sealed this

Eleventh Day of November, 2003

JAMES E. ROGAN
*Director of the United States Patent and Trademark Office*